United States Patent [19]

Harrison

[11] Patent Number: 4,821,677

[45] Date of Patent: Apr. 18, 1989

[54] METHOD OF MAKING ANIMAL LITTER HAVING IMPROVED ABSORBENT AND DEODORIZING QUALITIES

[75] Inventor: Robert E. Harrison, Culpeper, Va.

[73] Assignee: Virginia Mills, Inc., Culpeper, Va.

[21] Appl. No.: 114,310

[22] Filed: Oct. 27, 1987

[51] Int. Cl.$^4$ .............................................. A01K 1/015
[52] U.S. Cl. ........................................................ 119/1
[58] Field of Search ............................................. 119/1

[56] References Cited

U.S. PATENT DOCUMENTS

| | | | |
|---|---|---|---|
| 3,059,615 | 10/1962 | Kuceski et al. | 119/1 |
| 3,921,581 | 11/1975 | Brewer | 119/1 |
| 3,941,090 | 3/1976 | Fry | 119/1 |
| 3,983,842 | 10/1976 | Marion et al. | 119/1 |
| 4,217,858 | 8/1980 | Dantoni | 119/1 |

*Primary Examiner*—Robert P. Swiatek
*Attorney, Agent, or Firm*—Nelson & Roediger

[57] ABSTRACT

A method of making animal litter and the product produced thereby which utilizes ground peanut hulls, peanut shells and finely ground natural mineral in a dry mixture. The mixture is subjected to a preconditioning step which heats the mixture by steam injection prior to extrusion into pellets followed by air drying. The vegetable oil content of the peanut shells provides a binder for the pellet. The mineral constituent provides ionic bonding for the nitrogen ions in liquid animal waste to reduce the odor of animal litter exposed thereto.

12 Claims, No Drawings

METHOD OF MAKING ANIMAL LITTER HAVING IMPROVED ABSORBENT AND DEODORIZING QUALITIES

BACKGROUND OF THE INVENTION

This invention relates to a method of making animal litter having improved absorptive and deodorizing qualities and the product produced thereby.

The increasing number of households in this country enjoying the presence of domestic animals has generated a tremendous market for animal litter which not only serves as a repository for the animal waste products within a dwelling but also exhibits absorptive and deodorizing qualities to reduce the unpleasant characteristics of these products. Among the attributes that are desired in animal litter are that the material be lightweight so that it can be handled in bulk by people of all ages and inexpensive so that it can be changed with great frequency. In addition, the material should be highly absorptive of liquids and possess a deodorizing quality which reduces the impact of waste product odor in the adjacent environment.

One commercially successful animal litter product specifically directed at the cat owner market utilizes a natural clay product which is mined and then ground to an appropriate size and bagged for use. This product has achieved success because it is relatively dust-free, lightweight and generally inexpensive. The ground clay is absorptive of liquid waste products. A competing product has been manufactured from agricultural waste, typically peanut hulls, to which has been added a natural carrier of chlorophyl so that the product is not only absorptive but seeks to utilize the chlorophyl in the added grasses or straw to provide a deodorizing attribute to the product. The use of an agricultural by-product has great appeal from the standpoint of cost of raw material and also upon disposal of the used product since it is composed of organic matter which can be returned to the soil.

A primary objective of the present invention is the provision of a method of manufacturing animal litter from agricultural by-products with the product produced thereby possessing absorptive and deodorizing qualities. The method utilizes the properties of the natural constituents to provide a compacted product that is essentially dust-free. In addition, animal litter made in accordance with the present method includes a naturally occurring constituent which enhances the absorption of odor-causing components of liquid waste by the product to reduce the ammonia odor characteristics of present litter products. The method of making the subject product and the use of natural organic and mineral matter therein results in a biodegradable litter product. Furthermore, the utilization of agricultural by-products provides a relatively low-cost litter material.

SUMMARY OF THE INVENTION

The present invention relates to a method of making animal litter and the product produced thereby which method includes the dry mixing of ground organic materials, typically agricultural process by-products, with a naturally-occurring mineral in an approximate weight ratio of 10:1 respectively. The organic matter is comprised primarily of ground peanut hulls which have been reduced to a particle size of minus 1/32, or less. A second component of the organic materials is an agricultural by-product containing a significant amount of vegetable oil and the preferred method of making this litter product includes the step of adding peanut skins as the second component to the dry mixture.

The combination of the ground peanut hulls having a relatively small particle size and the peanut skins which are rich in vegetable oil are both, for the most part, agricultural waste products which heretofore have created disposal problems for the processing industry. In addition to the organic constituents, a natural mineral product is added to the dry mixture. This mineral is a hydrated silicate of aluminum including either sodium or calcium or both. These materials have often been referred to as natural zeolites to which a variety of different mineral names have been applied.

In addition, the dry mixture preferably includes a mold inhibitor added thereto. The mixture is agitated to substantially uniformly distribute the constituents throughout. Next, the mixture is exposed to steam to thereby form a wetted and heated mass. This heated mass is then compressed in combination with the use of suitable dies to form dimensioned pellets. The compressive forces in the extrusion of the material are aided by the vegetable oils present in the mixture which are retained therein to serve as a binder for the dimensioned pellets.

The formed pellets are then dried to further reduce the moisture content thereof and are then bagged for shipment to the consumer. The preferred embodiment of the product made by this process includes four ingredients, three of which are naturally occurring products. The bulk of the volume of this biodegradable product is comprised of peanut hulls and peanut skins thereby providing a product having a relatively low-cost feed stock.

The addition of the naturally occurring mineral has been found to provide an effective trapping mechanism for the liquid animal waste products. When wetted by liquid animal waste, it is believed that the ions available from the mineral bond to the nitrogenous ions found in liquid waste. As a result, the amount of ammonia available to enter the atmosphere is reduced. Thus, it is felt that the improved deodorizing characteristic of the present material is due primarily to the entrapment of the ammonia-forming ions rather than absorption of liquids occurring with natural clay product. The absorptive characteristics of the product are enhanced by the fact that it is composed of crushed peanut hulls which constitute the major portion of the material.

Further features and advantages of the invention will become more readily apparent from the following detailed description of a preferred embodiment of the product and the method of making same.

DESCRIPTION OF THE PREFERRED EMBODIMENT

Referring now to the present method of making animal litter, organic matter in the form of bulk peanut hulls or shells rough ground from agricultural processing plants are supplied to a hammer mill which reduces their effective size so as to pass through a 5/16 inch hammer mill screen. Then, the peanut hulls are subjected to coarse grinding to a particle size of less than 1/32 inch. The ground peanut hulls are then supplied to a mixer in the dry state.

The skins of peanuts are available from peanut processing mills as a by product of their manufacturing processes and these are stored for use in the present process in separate storage. The peanut skins are added to the mixture without being ground since they are typically brittle and are reduced in size during the subsequent agitation of the dry mixture. The quantity of peanut skins added is typically less than 10 percent by weight of the hulls since they have limited absorptive characteristics and are included primarily for the benefits provided to the process of making the product. In the commercial product produced by the present method, the weight percent of peanut skins in the product is approximately 5 percent. In addition, a mold retardant is added to the mixer and, in practice, calcium propionate, have been found effective for use in the present method and product.

A naturally occurring mineral from the class of hydrated silicates of aluminum which contain either sodium or calcium or both, of the generalized formula $Na_2O \cdot Al_2O_3 \cdot nSiO_2 \cdot xH_2O$ is prepared for use in the dry mixture. This type of naturally-occurring mineral is found throughout the United States and often is referred to as analcite, chabazite, heulandite, natorlite, stilbite, and thomsonite. These minerals are hydrated crystalline material and are fine ground to be readily dispersed throughout the mixture. In the present method, the mineral is subjected to fine grinding so that it is sized to substantially minus 30 mesh. As a result, the surface area available to be contacted by liquid animal waste is greatly increased and, thus enhances the deodorizing capability of the resultant product. The amount of finely-ground mineral added to the dry mixture expressed as a weight ratio to the peanut hulls or shells is approximately 1:10.

The constituents of this novel animal litter product are dry mixed and then placed in a preconditioner wherein steam is injected under pressure into the mixture while it is being agitated. The continuous agitation is preferred to prevent any segregation of the materials caused by wetted peanut hulls agglomerating and thus altering or effecting the distribution of constituents throughout. This exposure of the mixture to steam forms a heated mass in preparation for the forming of the mass into dimensioned pellets. The steam is provided as low-moisture or unsaturated steam and the mixture is exposed thereto for a short period to elevate the mixture temperature to within the range of 165 to 200 F. degrees. Tests performed with a dry mixture of 2000 pounds of ground peanut hulls, 100 pounds of peanut skins and 200 pounds of fine ground mineral have demonstrated that, at mixture temperatures above 200 F. degrees, the mixture absorbs excessive moisture and cannot be formed into pellets. At temperatures below 165 F. degrees, the mixture does not extrude properly and it is believed that this is due in part to the vegetable oil in the peanut skins not being released to serve as a binder for the resultant pellet. In the manufacture of the commercial product, the mixture is exposed to the steam so as to raise its temperature to 190 F. degrees which requires approximately 30 seconds for the quantity processed.

The natural moisture of the mixture prior to the preconditioning step has been found to be within the range of 12 to 14 weight percent. After preconditioning with steam to elevate the temperature of the mixture, the moisture content was determined to have increased less than 50% to the 16 to 20 percent weight range.

The preconditioned material, in a heated state, is then urged through a 3/16 inch die to form uniform, elongated cylindrical pellets. In the operation of the preferred method, the pellets have a length dimension of ¼ inch. The particles are then transported to a forced air dryer wherein the moisture content is reduced to the range of 7% to 10% weight. The forced air dryer operates without the introduction of heat so as to limit the energy necessary to make the present product. Prior to bagging the product for shipment, the dried pellets are transported over a ⅛ inch screen to remove fines, dust and undersize particles. Following this screening, the finished product is moved to a bagging assembly line for shipment to the consumer.

The dry mixing of the ground organic matter with the finely ground mineral and continuing agitation during the preconditioning of the mixture has been found to provide a relatively uniform distribution of these materials, including the mold inhibitor, throughout. As a result, the composition of the formed dimensioned pellets is maintained substantially uniform so that all pellets contribute to the absorptive and deodorizing qualities of the resultant product. The addition of peanuts skins to the dry mixture in an approximate weight ratio of one part peanut skins to 20 parts processed peanut hulls has been found to provide both a binder for the resultant pellets and serves as a lubricant during the extrusion process.

The present product was subjected to comparative testing with a commercially available animal litter product stated on its container to consist primarily of natural ground clay. The tests were directed to measurements of moisture and ammonia absorbance utilizing a dilute solution of ammonium sulfate to represent liquid animal waste. The present product which is the subject of this application is identified as Sample 1 and the commercially available product is identified as Sample 2. Each sample quantity was 100 grams. In each test, 150 milliliters or 300 milliliters of a 54 milligrams per liter ammonium sulfate solution was added to the sample pairs. The material was stirred for 4 minutes after the addition of the solution and then filtered. The filtrate for each sample was then weighed. The testing laboratory made the assumption that 1 milliliter equal 1 gram and the amount of water absorbed by each sample set forth in the results shown hereinafter was calculated on this basis. The ammonia content of the filtrate for each sample was measured using a specific ion electrode probe. The ammonia concentration in milligrams per liter was multiplied by the volume of filtrate to determine the weight/quantity of ammonia which had not been absorbed. By calculating the difference, the amount of ammonia absorbed by the sample was then determined. The results of the comparative testing are set forth below:

|  | Sample 1 | Sample 2 |
| --- | --- | --- |
| Moisture Absorbance (%) |  |  |
| 150 ml | 82.5 | 60.3 |
| 300 ml | 58.2 | 26.8 |
| Ammonia Absorbance |  |  |
| 150 ml | 88.3 | 76.9 |
| 300 ml | 69.8 | 51.2 |

It is to be noted from the above testing that Sample 1, the present product produced in accordance with the subject invention, absorbed substantially more moisture and more ammonia than the commercially available animal litter product of Sample 2. Throughout the testing it was noted that the present product expands with the addition of water as it absorbs moisture and retains its physical characteristics, i.e., cylindrical shape, until saturation is achieved. This retention characteristic is attributed to the use of the peanut skins and the vegetable oil content thereof serving as a binder for the pelleted product. In contrast, the commercially-available product of Sample 2 required stirring to obtain saturation. If not stirred, the test showed that the water collected on top of the mass of Sample 2 and then was slowly absorbed.

The above-described results are obtained through the present method of dry mixing the agricultural by-products, the natural mineral additive and the mold inhibitor when these constituents have been appropriately sized. It is likely that the hydrated silicate of aluminum, when encountering the liquid animal waste, forms ionic bonds with nitrogen-containing ions so that the ammonia available to the surrounding environment is substantially reduced. This entrapment of odor-producing substances is in contrast to other animal litter products that utilize masking agents to emit different odors while merely absorbing animal liquid waste. The subject method and product have been found to provide an animal litter material well-suited for use by the pet owner while producing superior results as noted.

While the previous description has referred to specific embodiments of the method of making thereof and the animal litter product produced thereby, it is recognized that variations and modifications may be made therein without departing from the scope of the invention as claimed.

What is claimed is:

1. A method of making animal litter having improved absorptive and deodorizing qualities which comprises:
    (a) dry mixing ground organic matter containing peanut hulls and peanut skins in an approximate weight ratio of 20:1 respectively with a hydrated silicate of aluminum in an approximate weight ratio of 10:1 of organic matter to silicate;
    (b) exposing said mixture to steam thereby forming a heated mass;
    (c) compressing said heated mass to form dimensioned pellets; and
    (d) drying said pellets to further reduce the moisture content thereof.

2. The method in accordance with claim 1 further comprising the initial step of grinding said peanut hulls to particle size of minus 1/32 inch.

3. The method in accordance with claim 2 wherein the step of exposing the mixture to steam elevates the temperature of said mixture to within the range of 165 to 200 degrees F.

4. The method in accordance with claim 3 further comprising the step of preparing the hydrated silicate of aluminum by fine grinding so that said material is sized to substantially minus 30 mesh.

5. The method in accordance with claim 4 further comprising the step of agitating said dry mixture to substantially uniformly distribute the constituents thereof.

6. The method in accordance with claim 5 wherein said drying step reduces the moisture content of said pellets to the range of 7% to 10% by weight.

7. The method in accordance with claim 2 wherein the step of exposing the mixture to steam elevates the temperature of said mixture to approximately 190 degrees F.

8. An improved animal litter product which comprises:
    (a) a mixture of ground organic materials including peanut hulls and peanut skins added thereto to provide a substantial oil content to said mixture; and
    (b) hydrated silicate of aluminum having an approximate weight ratio of 1:10 of said mixture.

9. The animal litter product of claim 8, wherein said mixture of organic material includes peanut hulls having a particle size of minus 1/32 inch.

10. The animal litter product of claim 8 wherein peanut skins comprise approximately 5% by weight of said mixture.

11. The animal litter product of claim 8 wherein said hydrated silicate of aluminum is finely ground.

12. The animal litter product of claim 11 wherein said hydrated silicate of aluminum is sized to minus 30 mesh.

* * * * *